United States Patent [19]

Ewaschuk

[11] Patent Number: 5,728,246

[45] Date of Patent: Mar. 17, 1998

[54] METHOD OF APPLYING VENEER TO A SUBSTRATE

[75] Inventor: William John Ewaschuk, Scarborough, Canada

[73] Assignee: Nienkamper Furniture & Accessories Inc., Scarborough, Canada

[21] Appl. No.: 639,518

[22] Filed: May 1, 1996

[51] Int. Cl.$^6$ .................................................. B32B 31/20
[52] U.S. Cl. .......................... 156/211; 144/349; 156/212; 156/257; 156/216
[58] Field of Search ................................ 156/211, 212, 156/257, 216, 475, 479, 481, 494; 144/346, 349, 350, 351

[56] References Cited

U.S. PATENT DOCUMENTS

| | | | |
|---|---|---|---|
| 1,876,330 | 9/1932 | Loetscher | 156/212 |
| 2,336,852 | 12/1943 | Elmendorf | 156/211 |
| 2,815,309 | 12/1957 | Ganahl et al. | 156/211 |
| 2,998,637 | 9/1961 | Wallis | 156/211 |
| 3,135,644 | 6/1964 | Coplen et al. | 156/257 |
| 3,886,020 | 5/1975 | Shank, Jr. | 156/211 |

FOREIGN PATENT DOCUMENTS

| | | | |
|---|---|---|---|
| 2743231 | 4/1978 | Germany | 144/349 |
| 485071 | 1/1937 | United Kingdom | 156/211 |
| 568819 | 4/1945 | United Kingdom | 156/211 |

*Primary Examiner*—Michele K. Yoder

[57] ABSTRACT

The invention provides a method of applying a veneer to a substrate having edges with a compound curve. The invention includes the steps of trimming the veneer to provide a peripheral margin and applying a stretchable releasable adhesive tape to the margin, applying an adhesive to the surfaces of the substrate, positioning the veneer over the substrate and securing the veneer in position, and subjecting the veneer to a substantially uniform pressure over the substrate. An embodiment for convex edges provides the further steps of providing one or more v-shaped relief cuts converging where the curved edge surface meets the main surface and applying a releasable adhesive tape to retain a butt joint between the edges of each relief cut. An embodiment for concave edges provides the further steps of providing one or more slits extending into the margin of the veneer parallel to the direction of the grain and applying a releasable adhesive tape over the relief cuts. The invention thus permits a single sheet of veneer to be applied over the main and edge surfaces of furniture and the like having concave or convex rounded or bullnose edges.

20 Claims, 4 Drawing Sheets

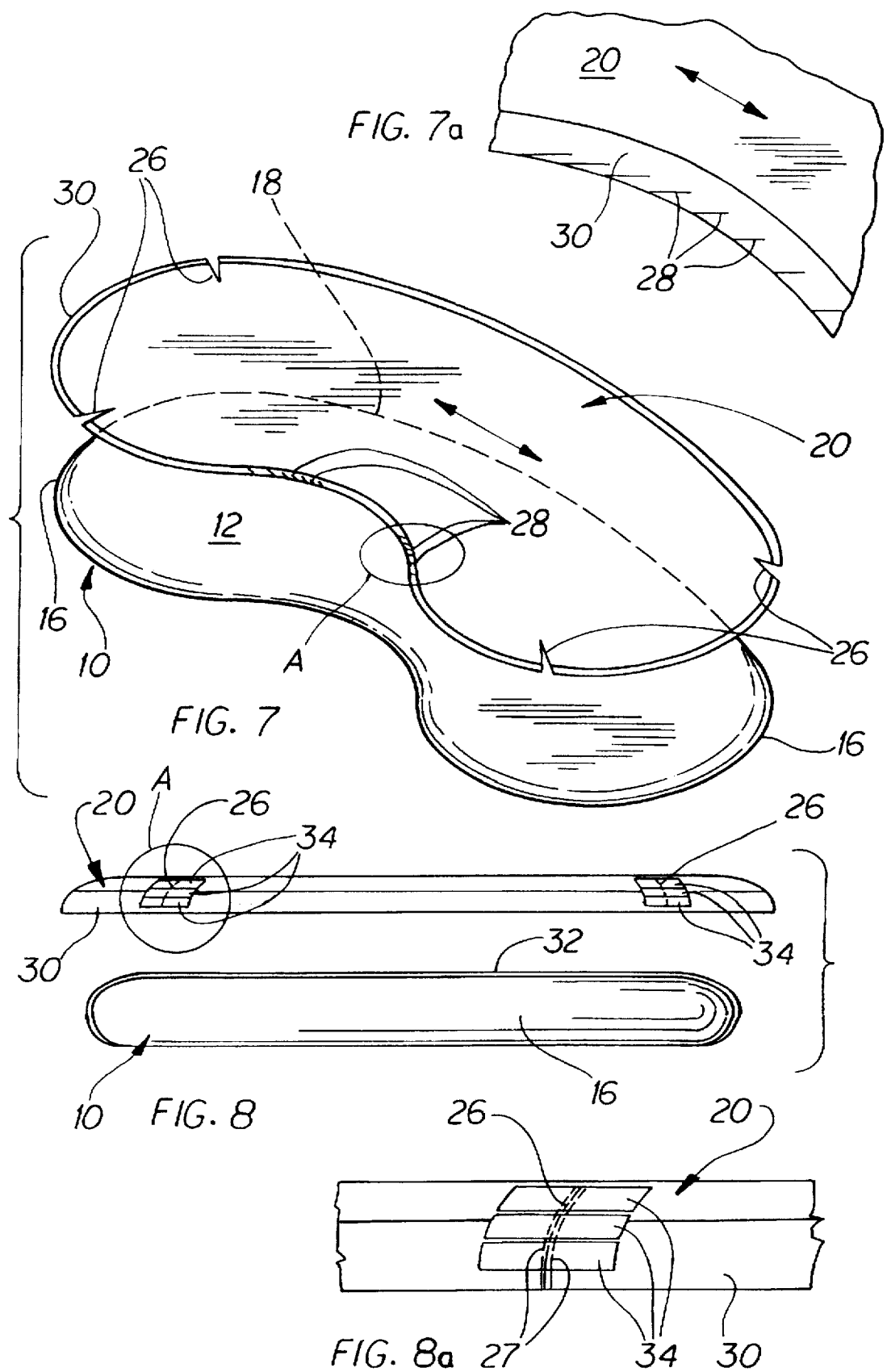

METHOD OF APPLYING VENEER TO A SUBSTRATE

FIELD OF INVENTION

The present invention relates to a method of applying a veneer to a form. In particular, the present invention relates to a method of applying a wood veneer to a substrate having at least one edge with a compound curve.

BACKGROUND OF THE INVENTION

Many commercial products are manufactured from particle board or fibreboard, which is relatively inexpensive and environmentally friendly in that it is composed in large part of scrap and recycled wood. For the same reason, however, these materials are aesthetically inadequate for articles such as furniture, the appearance of which is important.

Often a thin wood veneer is bonded to the surface of a particle board or fibreboard substrate, so that the advantages of both low cost and aesthetic appeal are obtained. Because of the flexibility of a typical wood veneer, conventional processes for applying a wood veneer to substrate or "core" are sufficient where the edges of the article are curved in only one direction. For example, where the circular edge of a surface such as a round table top is flat in profile, so that a sharp corner separates the top surface from the edge surface, a sheet of veneer applied to the main surface of the table top is trimmed flush with the edge and a separate strip of veneer is applied to the edge surface. The seam between the two veneers is readily visible, but natural at the sharp corner. Conversely, where the straight edges of, for example, a rectangular table top are rounded or "bullnose" in profile, a single sheet of veneer can be applied to the main surface, wrapped around the edges and trimmed along the lower portion of the edge surfaces where they meet the underside of the table top so that the only visible seams are at the abutting ends of the edges surfaces.

However, in a case where a core has an edge with a compound curve, for example a round table top with an edge that is rounded in profile, there has previously been no viable method of applying a single sheet of veneer to both the main surface and the edge of the core. Using a separate strip of veneer to finish the edges leaves a visible seam between the top surface and the edge, which defeats much of the aesthetic appeal of a rounded edge.

As such, manufacturers conventionally cut the core smaller than the finished product requires, and frame it with solid wood flaming strips that are formed with a round, bullnose or another desired profile. This has a number of cost disadvantages, requiring both the use of more costly solid wood framing strips for the edges and additional labour to cut the wood edges to exact dimensions, bond them to the core, and, where the framing strips meet the veneer applied to the core, finish the seam so that it matches the veneer. This method also presents the problems of matching wood finishes and wood grains, which if not expertly done can detract significantly from the visual appeal of the finished product.

SUMMARY OF THE INVENTION

The present invention overcomes these disadvantages by providing a method of applying a wood veneer to a substrate which has one or more edges with a compound curve. The method of the invention allows a single sheet of veneer to be bonded to the main surface and the edges of the core. Relief cuts may be used which leave very small seams that blend in with the natural grain of the veneer and are virtually invisible. The invention can be applied to both convexly and concavely curved edges, and reduces both material and labour costs in comparison to conventional methods.

The present invention thus provides a method of applying a veneer having a grain to a substrate having a main surface and at least one curved edge having a compound curved surface, comprising the steps of trimming the veneer to provide a peripheral margin which extends beyond the curved edge of the substrate, applying a stretchable releasable adhesive tape to the margin of the veneer, applying an adhesive to the main and edge surfaces of the substrate, positioning the veneer over the main and edge surfaces of the substrate and securing the veneer in position with releasable securing means, and subjecting the veneer to a substantially uniform pressure over the main and edge surfaces of the substrate.

The invention further provides a method of applying a veneer having a grain to a substrate having a main surface and at least one curved edge having a compound curved surface, comprising the steps of trimming the veneer to provide a peripheral margin which extends beyond the curved edge of the substrate, applying a stretchable releasable adhesive tape to the margin of the veneer, providing one or more v-shaped relief cuts, each relief cut having edges diverging toward a perimeter of the veneer and converging at substantially a point of inflection where the curved edge surface meets the main surface, the relief cuts being disposed within a quadrant of the veneer in which the grain of the veneer approaches a tangent of the curved edge, applying a releasable adhesive tape to retain a butt joint between the edges of each relief cut, applying an adhesive to the main and edge surfaces of the substrate, positioning the veneer over the main and edge surfaces of the substrate and securing the veneer in position with releasable securing means, and subjecting the veneer to a substantially uniform pressure over the main and edge surfaces of the substrate.

The invention further provides a method of applying a veneer having a grain to a substrate having a main surface and at least one curved edge having a compound curved surface, comprising the steps of trimming the veneer to provide a peripheral margin which extends beyond the curved edge of the substrate, applying a stretchable releasable adhesive tape to the margin of the veneer, providing one or more relief cuts extending into the margin of the veneer, the relief cuts being slits which are substantially parallel to the direction of the grain, the relief cuts being disposed within a quadrant of the veneer in which the direction of the grain of the veneer approaches a tangent of the curved edge, such that a spacing between adjacent relief cuts decreases as the direction of the grain of the veneer approaches a tangent of the curved edge, applying a stretchable releasable adhesive tape over the relief cuts, applying an adhesive to the main and edge surfaces of the substrate, positioning the veneer over the main and edge surfaces of the substrate and securing the veneer in position with releasable securing means, and subjecting the veneer to a substantially uniform pressure over the main and edge surfaces of the substrate.

BRIEF DESCRIPTION OF THE DRAWINGS

In drawings which illustrate by way of example only a preferred embodiment of the invention.

FIG. 7 is a perspective view of the veneer prepared for application to the table top of FIG. 3;

FIG. 7a is an enlarged perspective view of the section A in FIG. 7 showing the relief cuts in the concavely curved edge;

FIG. 8 is a side elevation of the veneer positioned for application to the table top of FIG. 2;

FIG. 8a is an enlarged side elevation of the section A in FIG. 8 showing the relief cuts in the convexly curved edge taped to form a butt joint;

DETAILED DESCRIPTION OF THE INVENTION

The invention provides a method of applying a veneer 20 to a substrate 10 which has at least one edge with a compound curve. The invention will be described by way of example with reference to an embodiment using a substrate or "core" preferably composed of a medium-density fibreboard, however the method of the invention can also be readily applied to a particle board or solid wood core 10. Other core materials may be suitable, and the invention is not intended to be limited by the choice of core material.

Figure 1:
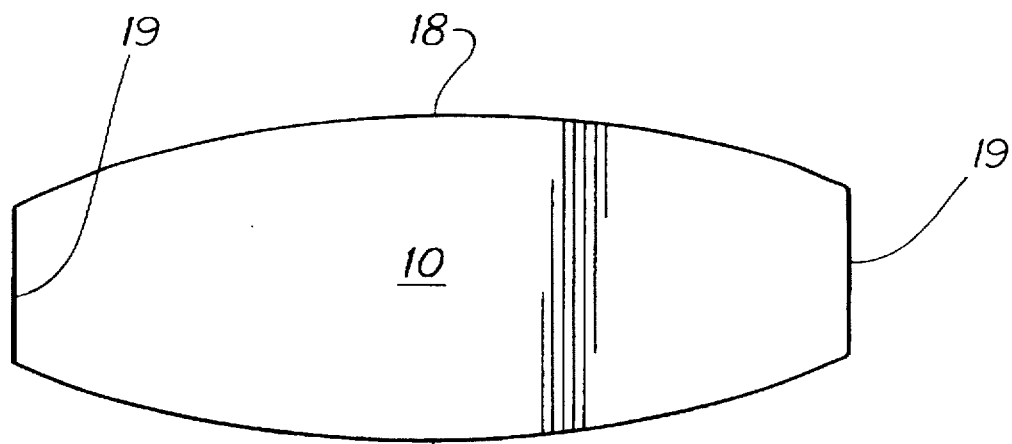
FIG. 1 is a top plan view of a first example of a table top embodying the invention.
Figure 2:
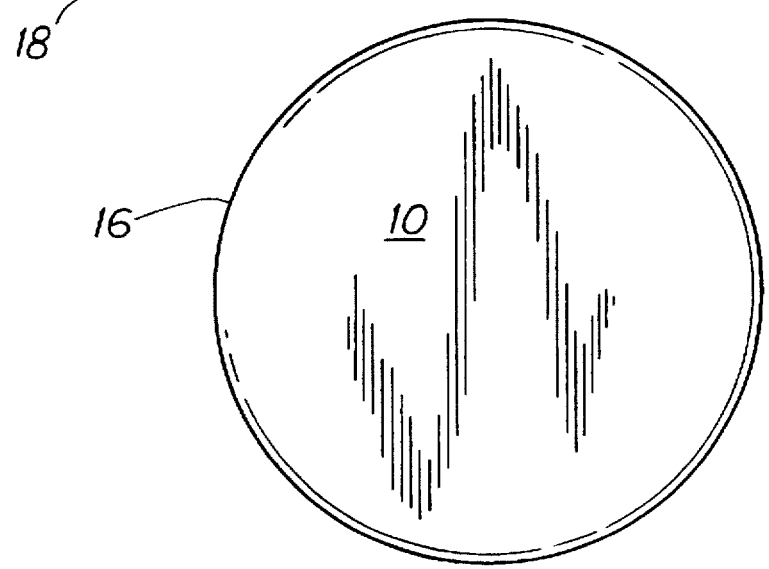
FIG. 2 is a top plan view of a further example of a table top embodying the invention.
Figure 3:
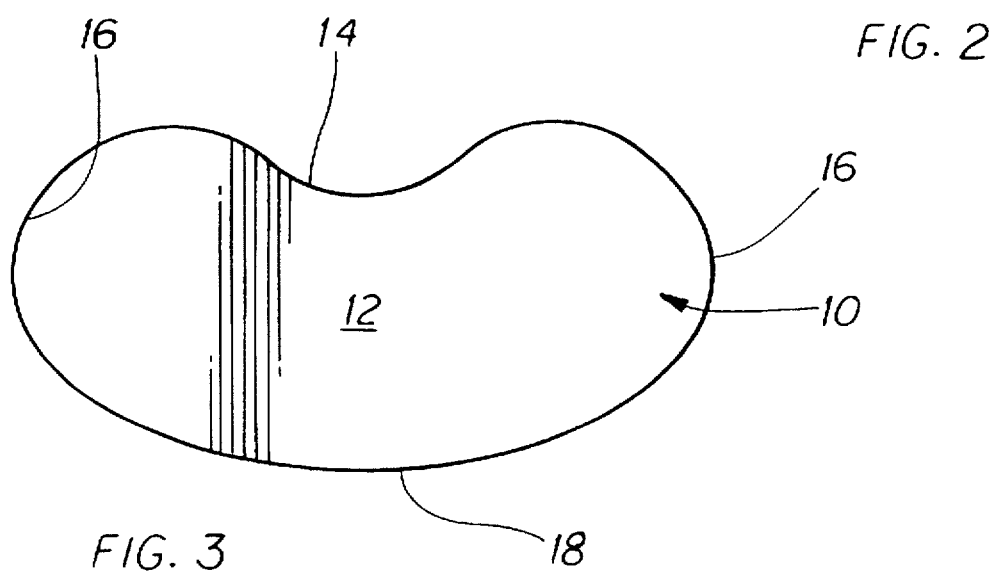
FIG. 3 is a top plan view of a still further example of a table top embodying the invention.
Figure 4:
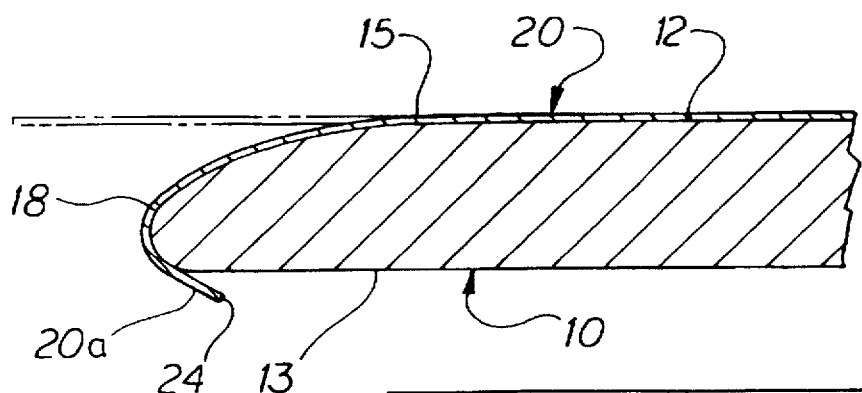
FIG. 4 is partial cross section of the curved edges of the table tops of FIGS. 1 to 3.

The core 10, examples of which are illustrated in FIG. 1 to 3, comprises a substantially planar main surface 12 merging into one or more curved edges 14, 16 and/or 18. In FIG. 1 the core 10 is a truncated oval, with long sweeping curved side edges 18 and flat end edges 19; in FIG. 2 the core 10 is circular, with a single convex curved edge 16; and in FIG. 3 the core 10 is "kidney" shaped, presenting both a concavely curved edge 14 and convexly curved edges 16, 18 abutting the main surface 12. In each case the edges 14, 16, 18 are also rounded in profile, as shown in FIG. 4, which results in a compound curve in the surface each edge 14, 16, 18. As used herein the terms "convex" and "concave" refer to the circumferential curvature of the edges 14, 16, or 18 as seen in top plan view, while the terms "rounded" or "bullnose" refer to the transverse curvature or profile of the edges 14, 16, or 18, as illustrated in FIG. 4.

The veneer 20 is preferably a standard wood veneer having a thickness between approximately 1/38 inch and 1/49 inch. It is important that any splices in the selected veneer 20 be butt glued, for example by a Diel splicer, rather than stitched with hotmelt thread.

According to the invention the veneer 20 is prepared prior to application to the core 10. The steps involved in the preparation of the veneer 20 differ somewhat depending upon whether the core 10 has concavely curved edges 14 or convexly curved edges 16, 18, and depending upon the radius of curvature of the edges 14, 16, 18.

Large Radius of Curvature—Convex and Concave Curves

Figure 5:
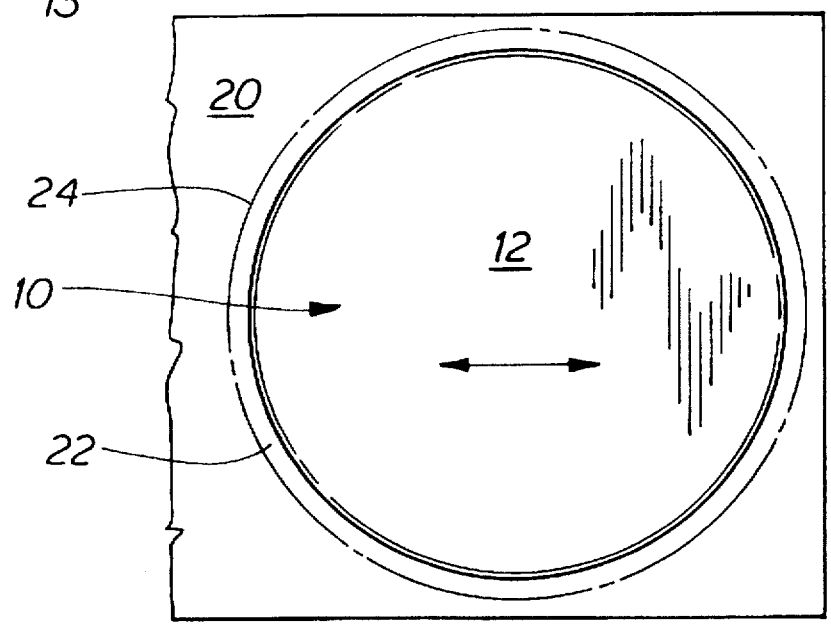
FIG. 5 is top plan view of the core of FIG. 2 positioned over the veneer for trimming.

In the case of long sweeping curves having a radius of curvature greater than about 48 inches, for example the edges 18 of the table top shown in FIG. 1, a wood veneer 20 of standard thickness is generally sufficiently resilient to accommodate the curve without requiring relief cuts. The veneer 20 is trimmed to conform to the shape of the main surface 12 of the core 10, flush with the straight edges 19. Along the curved edges 18 the veneer 20 is trimmed with a peripheral margin 22 that overhangs the main surface 12 and follows the curvature of the edges 18, as in the example shown in FIG. 5 for a round tabletop. The width of the margin 22 should be only slightly larger than required to cover the surface of the edge 18, so that after pressing 18 there will be no more than 1/4 inch of excess veneer 20a to trim away, as shown in FIG. 4, since any additional excess veneer 20a can cause the veneer 20 to crack when pressed. For a rounded edge having the profile illustrated in FIG. 4 this would be achieved by cutting the veneer 20 so that when it is laid flat the perimeter 24 of the peripheral margin 22 extends approximately 1/2 inch beyond the outer limit of the edge 18 (as shown in phantom lines in FIG. 4).

A strip of stretchable, releasable adhesive tape 30, for example 2" brown packing tape made by Sellotape (trademark), is applied to the top surface of the veneer 20 over the peripheral margin 22 along the entire length of each curved edge 18. The tape 30 is rubbed thoroughly to ensure complete adhesion to the veneer 20.

An adhesive compound 32 is applied evenly over the main surface 12 and the edges 18 of the core 10. The adhesive 32 preferably consists of a crosslinked polyvinylacetate with a solids content of approximately 64%. While some variance in the solids content may be acceptable for certain applications, in general a higher moisture content causes undue expansion of the veneer 20 while a higher solids content increases the viscosity of the adhesive 32 to the point where it becomes difficult to spread.

Figure 9:
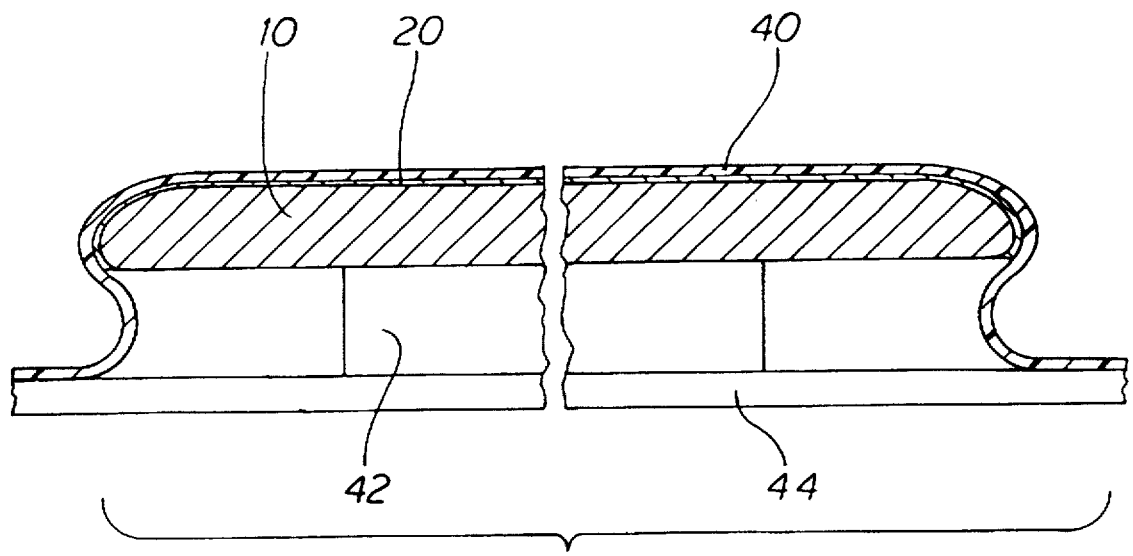
FIG. 9 is a side elevation of the core of FIG. 8 during the pressing process.

To apply the veneer 20 to the core 10, the veneer 20 is located over the core 10 and held in position by releasable securing means such as releasable adhesive tape (not shown) affixed to the underside 13 of the core 10. The core 10, with veneer 20 taped in position, is placed into a vacuum press membrane 40, as shown in FIG. 9. The vacuum press is of a conventional frame type design with a neoprene or gum rubber membrane 40, or for more complex or difficult shapes a conventional bag type vacuum press (not shown) may be used. The core 10 is elevated from the platen 44 by one or more spacer blocks 42, as shown in FIG. 9, which allows the membrane 40 to pull itself partially under the core 10 and thus ensure a substantially uniform pressure over the entire rounded surface of the edges 18. The membrane 40 is sealed and the vacuum is drawn to 24 inches of mercury and retained at that level until the adhesive 32 has set. For best results the portions of the membrane 40 covering each edge 18 of the core 10 should be manipulated at the beginning of the pressing process to remove wrinkles and thus ensure even compression over the entire edge 18. When the adhesive 32 has set the core 10 is removed from the membrane 40 and the releasable tape 30 is removed from the veneer 20.

Small Radius of Curvature—Convex Curves

Figure 6:
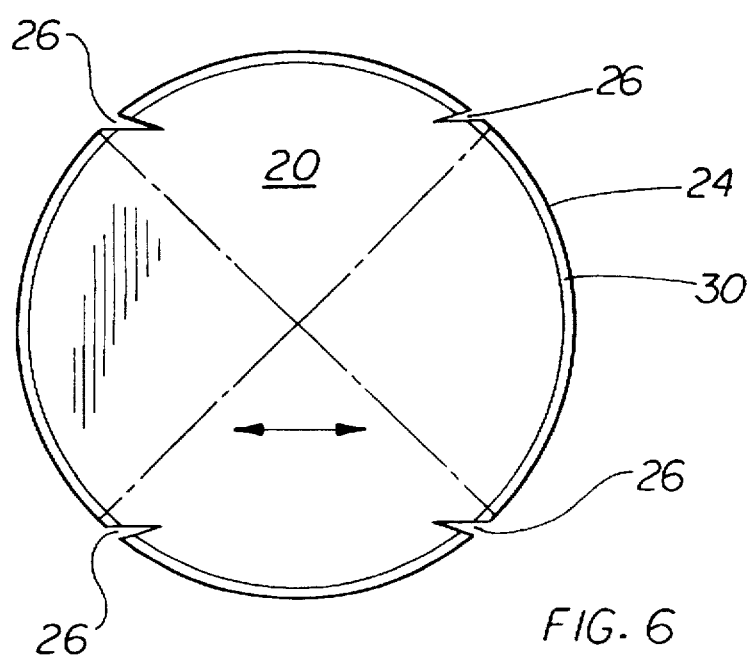
FIG. 6 is top plan view of the veneer of FIG. 5 after trimming.

In the case of convexly curved edges 16 having a radius of curvature of less than 48 inches, as in the circular table top of FIG. 2 or the ends of the kidney-shaped table top of FIG. 3, the veneer 20 must be further prepared before pressing to remove excess material that would cause wrinkles or folds in the veneer 20 at the edges 16. In such cases, after the veneer 20 has been trimmed and taped with the stretchable adhesive tape 30 as described above, the veneer 20 is prepared by providing one or more v-shaped relief cuts 26 through the peripheral margin 22, as shown in FIGS. 6 and 7. Each relief cut 26 has edges 27 diverging toward the perimeter 24 of the veneer 20 and converging at a point which will overlay the point of inflection 15 between the curved edge 16 and the main surface 12.

The relief cuts 26 are disposed within, but preferably near the borders (shown in phantom in FIG. 6) of, each quadrant in which the direction of the grain (shown by the arrows in FIG. 6) of the veneer 20 approaches a tangent of the curved edge 16. The relief cuts 26 are preferably oriented such that the bisector of each v-shaped relief cut 26 is substantially parallel to the direction of the grain. For a completely circular core 10 the relief cuts 26 would be required in four locations, as shown in FIG. 6. At the perimeter 24 of the veneer 20 the edges 27 of the relief cut 26 are spaced apart between ⅛ inch and ¼ inch, this spacing increasing as the radius of curvature of the edge 16 decreases.

The edges 27 of the v-shaped relief cuts 26 are drawn together to form a butt joint, and 2 inch to 3 inch strips of a releasable adhesive tape such as ¾ inch masking tape 34 are applied transversely across the joint to retain the edges 27 in abutting position, as best seen in FIG. 8a. A strip of 2 inch masking tape (not shown) may optionally be affixed over the joint area to reinforce the ¾ inch tape strips 34. The veneer 20 is then applied to the core 10 and pressed in the manner described above.

Small Radius of Curvature—Concave Curves

In the case of concavely curved edges 14 having a radius of curvature of less than 48 inches, the veneer 20 must be prepared before pressing to allow the fibre structure of the veneer 20 to expand to achieve the profile of the edge 14 without cracking or splitting the veneer 20. As shown in FIG. 7, after the veneer 20 has been trimmed and stretchable tape 30 applied as described above, relief cuts 28 in the form of slits extending through a portion of the peripheral margin 22 are provided. The relief cuts 28 extend from the perimeter 24 of the veneer 20 to a point within the peripheral margin 22 about ⅛ to ½ inch from the perimeter 24.

The relief cuts 28 are made substantially parallel to the direction of the grain (shown by the arrows in FIG. 7) of the veneer 20 and are disposed within each quadrant of the veneer 20 in which the direction of the grain of the veneer 20 approaches a tangent of the curved edge 14. No relief cuts 28 are needed in any region where the grain direction is perpendicular to the edge of the veneer 20, since the wood fibres will naturally separate cleanly in these regions. The spacing between adjacent relief cuts 28 decreases and the length of the relief cuts 28 increases as the direction of the grain of the veneer approaches a tangent of the curved edge 14, as best seen in FIG. 7a. Preferably the outermost cuts 28 start at a spacing of approximately ¾, decreasing to a spacing of approximately ⅜ inch approaching the point where the veneer grain runs at a tangent to the edge 14.

Figure 10:
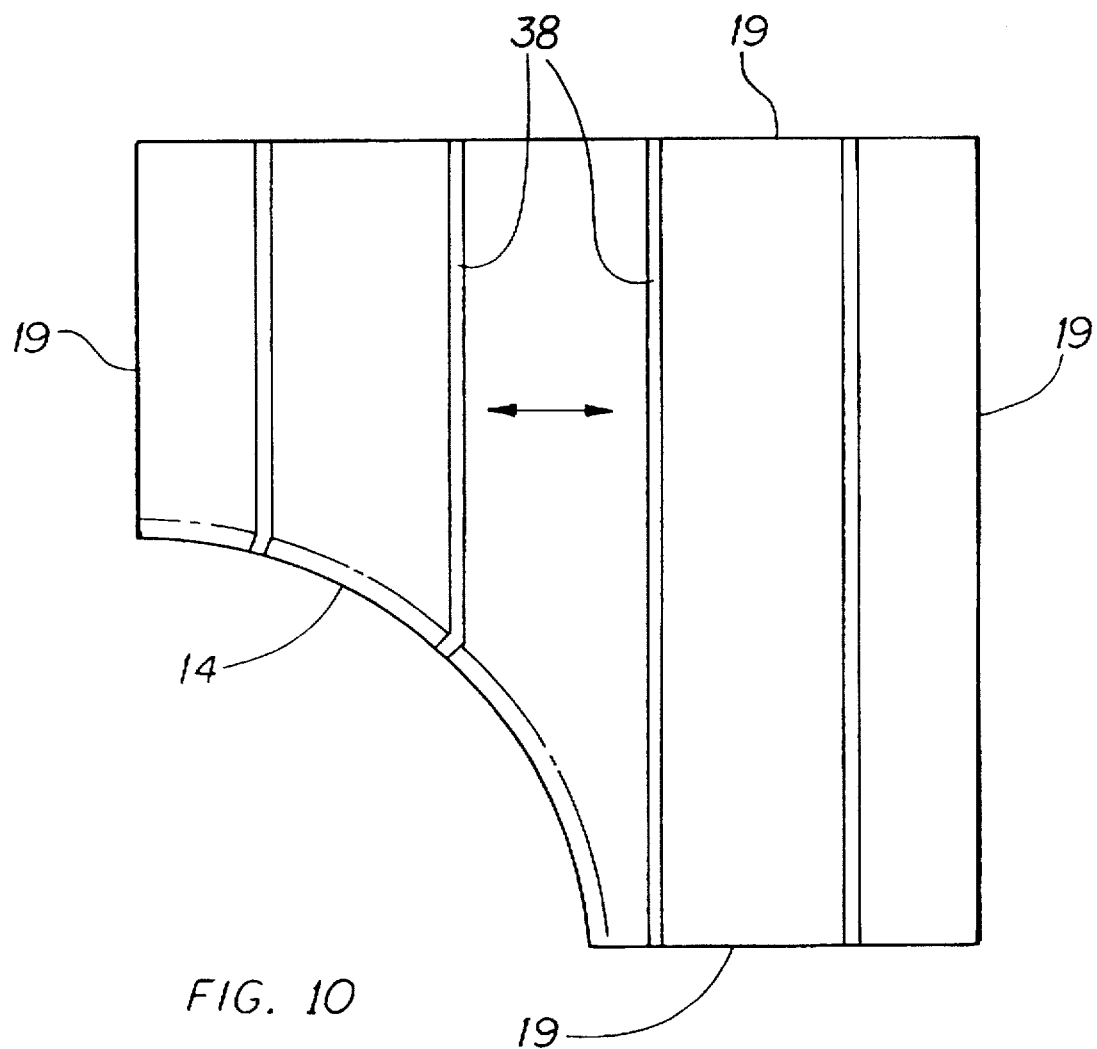
FIG. 10 is a top plan view of a further example of a table top embodying the invention.

Two layers of brown stretchable adhesive tape 30 are applied transversely over the relief cuts 28 and rubbed thoroughly to ensure complete adhesion to the veneer 20. For a concavely curved edge 14 with a very small radius of curvature (ie. less than 24 inches), as illustrated in FIG. 10, a clear, non-stretchable releasable adhesive tape 38 such as Scotch 355 (trademark) is applied to the veneer 20 transversely to the grain (shown by the arrows in FIG. 10), starting at the perimeter 24 of the veneer 20 and spacing the strips in the direction of the grain at 8 to 10 inch intervals to prevent separation of the fibres.

The method of the invention having been thus described by way of examples of preferred embodiments, it will be apparent to those skilled in the art that certain modifications and adaptations may be made without departing from the scope of the invention as defined in the appended claims.

I claim:

1. A method of applying a veneer having a grain to a substrate having a main surface and at least one curved edge having a compound curved surface, comprising the steps of trimming the veneer to provide a peripheral margin which will extend beyond the curved edge of the substrate when the veneer is brought into contact with the substrate, applying a stretchable releasable adhesive tape to a top surface of the margin of the veneer, applying an adhesive to the main and edge surfaces of the substrate, positioning the veneer over the main and edge surfaces of the substrate and securing the veneer in position with releasable securing means, elevating the substrate to allow for the application of pressure over the entire curved edge, subjecting the veneer to a substantially uniform pressure over the main and edge surfaces of the substrate until the adhesive has set, and removing the releasable adhesive tape.

2. The method of claim 1 in which the peripheral margin will extend beyond the curved edge of the substrate no more than ¼ inch.

3. The method of claim 1 in which the compound curved surface has a convex curvature.

4. The method of claim 1 in which the compound curved surface has a concave curvature.

5. The method of claim 1 including the step of providing one or more relief cuts in the peripheral margin of the veneer prior to applying the stretchable releasable adhesive tape.

6. The method of claim 5 in which the relief cuts are v-shaped having edges which diverge toward a perimeter of the veneer.

7. The method of claim 6 in which the edges of the relief cuts are drawn together to form a butt joint and retained together during application of pressure by releasable adhesive tape.

8. The method of claim 6 in which the relief cuts are disposed in each quadrant of the veneer in which a direction of the grain approaches a tangent of the curved edge.

9. The method of claim 5 in which the relief cuts are slits.

10. The method of claim 9 in which the slits are parallel to a direction of the grain.

11. The method of claim 9 in which the slits extend from a perimeter of the veneer to a point within the peripheral margin.

12. The method of claim 9 in which a spacing between the relief cuts decreases as a direction of the grain approaches a tangent of the curved edge.

13. The method of claim 1 in which a non-stretchable releasable adhesive tape is applied across the veneer transverse to a direction of the grain.

14. The method of claim 1 in which the veneer is of a thickness between ¹⁄₃₈ inch and ¹⁄₄₉ inch.

15. The method of claim 1 in which a vacuum press is used to subject the veneer to a substantially uniform pressure, and the core is elevated from a platen of the vacuum press by a spacer block.

16. The method of claim 6 in which the substrate is composed of particle board or fibreboard.

17. The method of claim 1 in which the adhesive is a cross-linked polyvinylacetate having a solids content of approximately 64%.

18. A product produced according to the method of claim 1.

19. A method of applying a veneer having a grain to a substrate having a main surface and at least one curved edge having a compound curved surface, comprising the steps of trimming the veneer to provide a peripheral margin which will extend beyond the curved edge of the substrate when the veneer is brought into contact with the substrate, applying a stretchable releasable adhesive tape to a top surface of the margin of the veneer, providing one or more v-shaped relief cuts, each relief cut having edges diverging toward a perimeter of the veneer and converging at substantially a point of inflection where the curved edge surface meets the main surface, the relief cuts being disposed within a quadrant of the veneer in which the grain of the veneer approaches a tangent of the curved edge, applying a releasable adhesive tape to retain a butt joint between the edges of each relief cut, applying an adhesive to the main and edge surfaces of the substrate, positioning the veneer over the main and edge surfaces of the substrate and securing the veneer in position with releasable securing means, elevating the substrate to allow for the application of pressure over the entire curved edge, subjecting the veneer to a substantially uniform pressure over the main and edge surfaces of the substrate until the adhesive has set, and removing the releasable adhesive tape.

20. A method of applying a veneer having a grain to a substrate having a main surface and at least one curved edge having a compound curved surface, comprising the steps of trimming the veneer to provide a peripheral margin which will extend beyond the curved edge of the substrate when the veneer is brought into contact with the substrate, applying a stretchable releasable adhesive tape to a top surface of the margin of the veneer, providing one or more relief cuts extending into the margin of the veneer, the relief cuts being slits which are substantially parallel to the direction of the grain, the relief cuts being disposed within a quadrant of the veneer in which the direction of the grain of the veneer approaches a tangent of the curved edge, such that a spacing between adjacent relief cuts decreases as the direction of the grain of the veneer approaches a tangent of the curved edge, applying a stretchable releasable adhesive tape over the relief cuts, applying an adhesive to the main and edge surfaces of the substrate, positioning the veneer over the main and edge surfaces of the substrate and securing the veneer in position with releasable securing means, elevating the substrate to allow for the application of pressure over the entire curved edge, subjecting the veneer to a substantially uniform pressure over the main and edge surfaces of the substrate until the adhesive has set, and removing the releasable adhesive tape.

* * * * *